STEAM OPERATED HOT WATER HEATER WITH PREHEATER
Filed Feb. 17, 1967 2 Sheets-Sheet 1
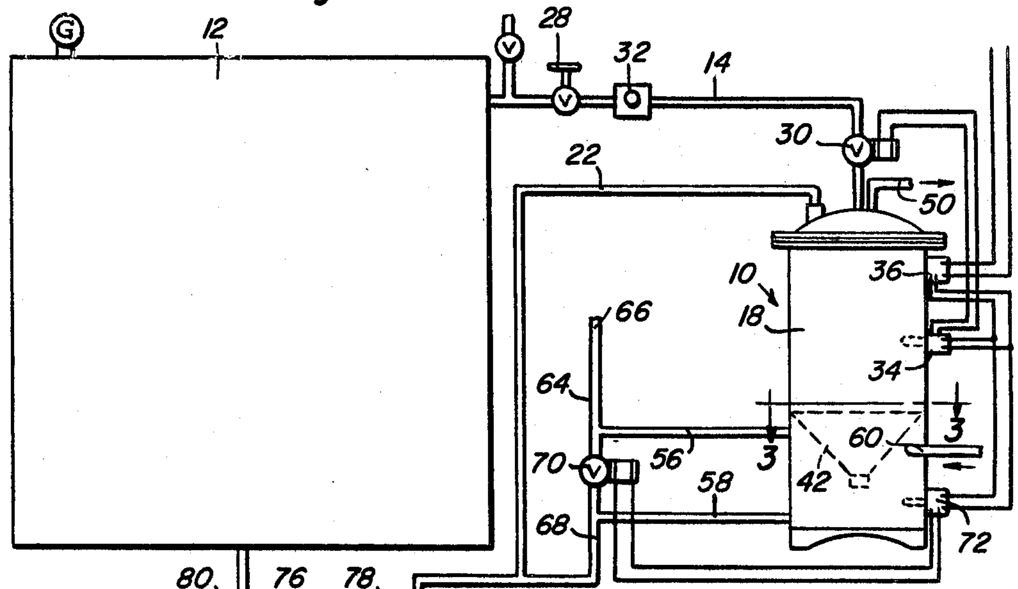
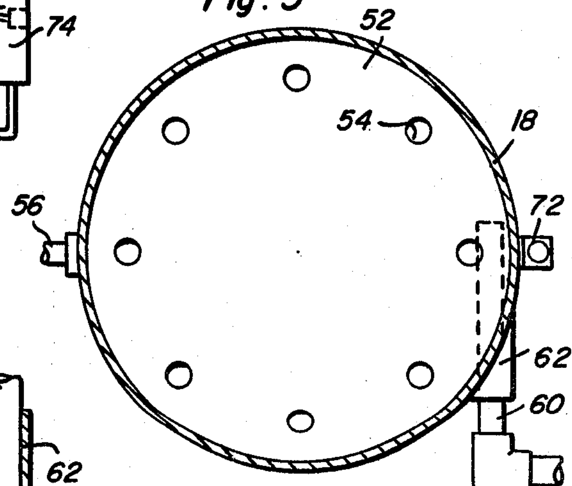
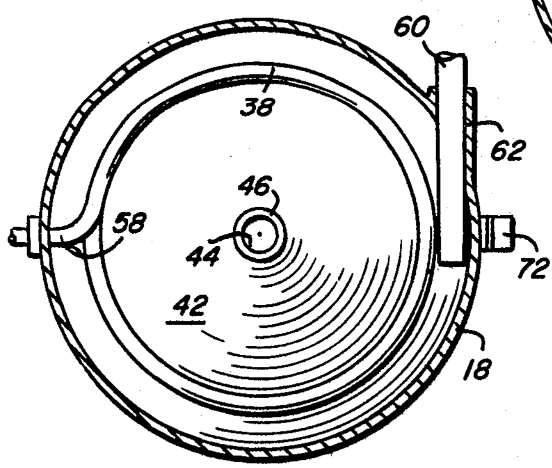
James A. Phillips, Jr.
INVENTOR.
BY Clarence A. O'Brien
and Harvey B. Jacobson
Attorneys

STEAM OPERATED HOT WATER HEATER WITH PREHEATER

Filed Feb. 17, 1967 2 Sheets-Sheet 2

James A. Phillips, Jr.
INVENTOR.

BY Clarence A. O'Brien and Harvey B. Jacobson
Attorneys

United States Patent Office 3,387,591
Patented June 11, 1968

1

3,387,591
STEAM OPERATED HOT WATER HEATER WITH PREHEATER

James A. Phillips, Jr., Quantico, Md., assignor of thirty percent to James A. Phillips, Sr., and Leah M. Phillips, both of Quantico, Md., jointly Continuation-in-part of application Ser. No. 431,018, Feb. 8, 1965. This application Feb. 17, 1967, Ser. No. 616,915
8 Claims. (Cl. 122—32)

ABSTRACT OF THE DISCLOSURE

A water heater employing a primary steam heating coil (coil A) which absorbs and uses the latent heat of the steam passing through the coil together with a condensate latent heat salvage coil (coil B) disposed in the bottom of the water heater which is completely separated from the primary heating coil in the top part of the water heater. Coil B is connected to the steam traps of other steam using devices in the same plant or installation in order to absorb the latent heat of the steam which is normally lost is it is discharged from such steam traps through vents to the atmosphere and thereby raise the temperature of the incoming water in the lower part of the water heater. A truncated cone (point down) is placed in the water heating tank with the lower point of the cone being cut out to provide communication between the lower end of the water heating tank and the upper end thereof which primarily prevents convectional currents between the top and bottom portions of the tank. A flat plate having peripherally spaced holes overlies the cone so that water between the plate and the cone is substantially immobilized or static thus serving as a secondary means to retard convectional currents and as an insulating barrier between coil B and coil A in the upper portion of the heater tank.

This application is a continuation-in-part of application Serial No. 431,018 filed February 8, 1965.

The apparatus disclosed in this application represents certain novel improvements in that structure disclosed in copending application Ser. No. 431,018, filed February 8, 1965 for Steam Operated Hot Water Heater and claim is made to the benefit of that filing date as to common subject matter existing between the present application and the aforementioned copending application.

As is well known, one of the conventional methods of heating water by the use of steam is by employing a device utilizing a steam trap. Such devices employ a closed heating coil containing the heating medium which separates it from the heated medium with the closed coil terminating in a steam trap. A substantial part (approximately 39%) of the latent heat of the steam is normally discharged through the steam trap and lost via radiation of venting to the atmosphere thus materially reducing the efficiency of the output of the water heater.

The steam operated water heater disclosed in the copending application differs from such conventional devices in that it eliminates the steam trap entirely and substitutes therefor an impeding "water column" which is induced and controlled by the size and length of the closed coil tubing, location of the aquastat, and capacity of a governing orifice with a resultant improvement in efficiency. It is believed that up to approximately 30% of the total output of a steam boiler can be reclaimed or used by the present invention which results in a substantial saving to the operator because it requires much less heat in the top part of the water heater to finish raising the temperature of the water in the water heater unit

2 to the desired setting. This is accomplished by employing the auxiliary or additional heating coil serving to preheat the incoming water and to enable installation in a great many plant installations where conventional steam trap devices already are installed and operating. In such plant installations, it sometimes is not economic to replace the steam traps especially when such steam traps are necessary to be retained for other operations and needs.

Accordingly, where the steam operated water heater in to be installed in addition to and in close proximity with coventional steam trap devices, the present invention will improve the efficiency of the conventional steam trap units by absorbing and using the latent heat that is discharged from the steam traps and which is normally lost because it is exhausted through vents to the atmosphere.

The present invention includes the use of a steam operated hot water heater such as that disclosed in the aforementioned copending application having a steam coil in the upper portion of the heating tank and an additional coil or coils in the bottom of the heating tank which coils (coil B) are completely divorced from the heating coils (coil A) in the top part of the heating tank and which coils are connected to the discharge of existing steam traps in order to absorb the latent heat and substantial sensible heat of their discharge and thereby to preheat the water in the lower part of the heating tank.

Another object of the present invention is to provide a steam operated water heating unit in accordance with the preceding object having an inverted metal cone disposed above the auxiliary coil or coils with the cone having a central aperture at the lower apex thereof and being combined with a flat plate (spaced above the cone and provided with peripherally spaced openings therein) to form an insulation barrier and to minimize undesirable transfer of heat from the bottom part of the heating tank to the top part of the tank due to convectional flow inasmuch as flow of water through the tank will occur when there is a demand for hot water from the top of the tank causing the water in the tank to flow upward because of normal and usual water pressures.

A further object of the invention is to provide a steam operated water heating unit in accordance with the preceding objects in which the cold water inlet pipe is brought into the heating tank below the top of the cone and at an angle so as to create a circular flow of water in a counterclockwise direction to increase the mixing of the incoming water with the water in the lower end of the heating tank. The peripheral arrangement of the apertures in the plate disposed above the cone initially directs water flow to the outside periphery of the upper part of the heating tank instead of straight up through the center of the tank thereby assuring that the water flowing from the bottom of the tank into the top of the tank will pass around the upper heating coil rather than passing straight up through the center of the coil to a hot water outlet. An aquastat for the preheater is located in the water surrounding the bottom set of coils with the aquastat controlling an electric solenoid valve between the input side of the condensate and the output side of the condensate so that if the water in the bottom part of the tank, due to a lack of hot water demand and due to absorbing heat from the bottom set of coils connected to the steam traps, reaches a predetermined temperature on the preheater aquastat, the electric solenoid valve will be actuated thus bypassing the lower heating coils due to the water obviously taking the easiest flow route. If hot water is drawn from the upper part of the tank before the water in the bottom of the tank reaches the predetermined temperature, then the preheated water from the bottom part of the tank will flow upward through the cone and baffle plate to the top part of the tank where the regular heating coils are functioning and will heat such water to the preset temperature while cold water enters the bottom of the tank to be preheated by the bottom set of coils thus forming a cycle which is repetitive with the aquastats controlling the temperatures at a preset level.

A further object of the present invention is to provide a steam operated hot water heater combined with preheating coils which utilize normally wasted latent heat and substantial sensible heat discharged by steam traps to preheat the incoming water to increase the efficiency of the water heating system while employing normally wasted heat.

These together with other objects and advantages which will become subsequently apparent reside in the details of construction and operation as more fully hereinafter described and claimed, reference being had to the accompanying drawings forming a part heerof, wherein like numerals refer to like parts throughout, and in which:

FIGURE 1 is a schematic illustration of the present invention installed in a conventional installation such as may be found in a laundry or the like;

Figure 2:
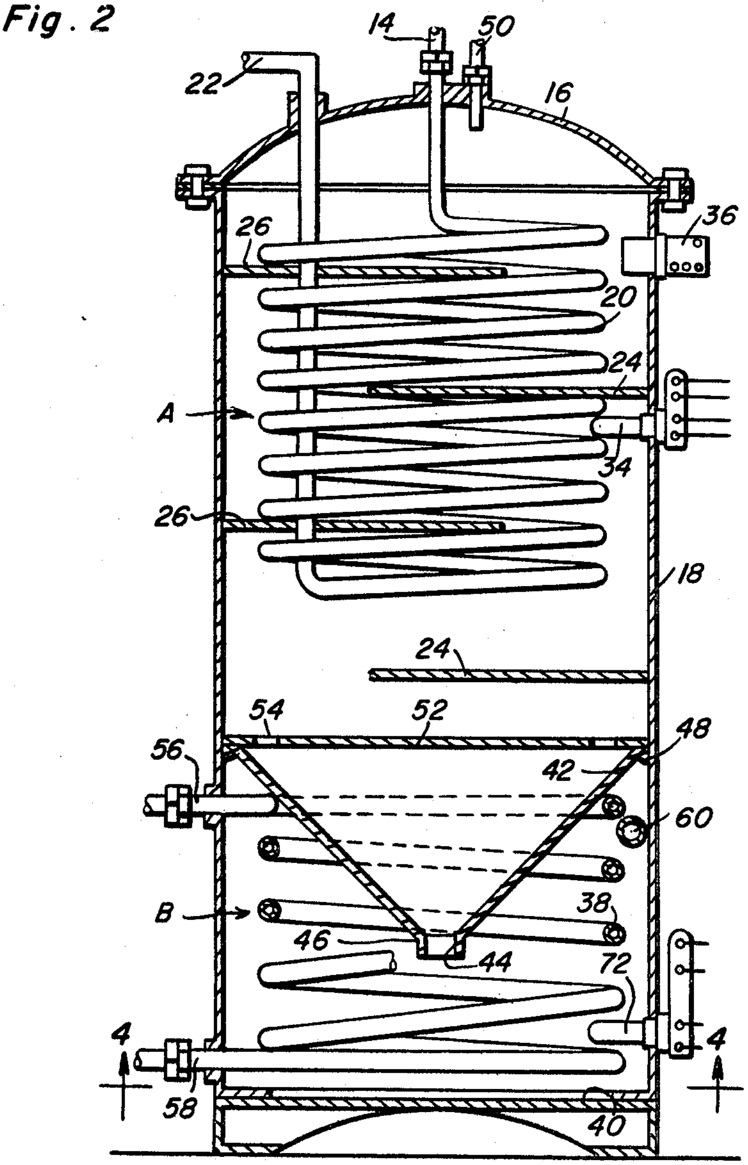
FIGURE 2 is a vertical sectional view of the steam operated water heating unit with the auxiliary coils and other structural features of the present invention illustrated associated therewith.

FIGURE 3 is a plan, sectional view taken substantially upon a plane passing along section line 3—3 of FIGURE 1 illustrating the specific construction of the flat baffle plate; and FIGURE 4 is a bottom plan sectional view taken substantially upon a plane passing along section line 4—4 of FIGURE 2 illustrating the construction and arrangement of the auxiliary coils and the association of the inverted cone associated therewith.

Referring now specifically to the drawings, the numeral 10 generally designates the steam operated water heating unit of the present invention which receives steam from a conventional boiler 12 via a steam supply or inlet line or pipe 14 which communicate with a multiple service line which services other equipment and extends down through the dome top 16 of the water heating tank 18. The steam line 14 is communicated directly with a spiral heating coil 20 (coil A) and the lower end of the coil 20 extends upwardly through the coil and outwardly through the top 16 of the tank 18 in a discharge line 22. Disposed interiorly of the tank 18 is a plurality of vertically spaced baffles 24 and 26 which extend transversely of the tank 18 but are of less cross-sectional area than the tank 18 so that a zigzag path for water flow up around the coil 20 will be provided. The baffles 24 are secured to one side of the tank 18 and the baffles 26 are secured to the opposite side thereof and the baffles are received between the convolutions of the coil and may be shaped to conform to the convolutions so that they may extend transversely across a substantial area of the tank.

The steam supply line 14 is provided with a manual valve 28 therein and also a solenoid operated valve 30 adjacent the tank 18. Also disposed in the steam line 14 is a changeable orifice 32 which controls the flow rate of steam to the coil 20. This orifice will vary in size depending upon the capacity of the boiler and other equipment associated therewith. By changing the orifice, the rate of production of heated water to a given temperature may be increased thus enabling the unit to be employed with boilers of various capacities.

Disposed in the middle of the upper portion of the tank 18, just below the uppermost baffle 24, is an aquastat 34 of conventional construction which controls the solenoid valve 30 in an obvious manner and receives electrical energy from a source such as a power line which is also connected to a pressure responsive switch 36 in the upper end of the tank which will deenergize the aquastat and close the valve 30 in the event excessive pressure develops in the tank 18. The pressure switch 36 may be used alone or may have a pressure relief valve incorporated therein or a separate pressure relief valve may be provided if desired.

Disposed in the lower portion of the tank 18 and below the lowermost baffle 24, there is provided an auxiliary steam coil or coils 38 (coil B) which salvages the latent heat of the condensate and extends to a point adjacent the bottom 40 of the tank and is generally cylindrical in arrangement. Disposed above and partially within the coil 38 is an inverted cone 42 of metal or the like in which the lower apex is provided with an opening 44 which preferably is formed by a short cylindrical member 46. The upper edge of the cone 42 is secured to the interior of the tank 18 by welding 48 or the like and as illustrated, the cone 42 has the apex thereof disposed centrally within the coil 38 so that the space above the horizontal plane of the opening 44 and outwardly of the cone 42 will serve somewhat as a reservoir for preheated water and such preheated water will gradually be heated down to the level of the opening 44 so that such preheated water will then also heat water that is disposed against the inner surface of the cone 42 thus retaining the water in the upper and of the lower section of the tank 18 in a warm condition so that it will be initially moved upwardly into the upper section of the tank 18 when water flows through the tank 18 such as by opening a valve in the hot water supply line 50.

Disposed at the upper end of the cone 48 and secured to the inner surface of the tank 18 is a flat baffle plate 52 extending completely across the tank 18 and forming a partition except for a plurality of peripherally spaced openings 54 extending therethrough. As illustrated, the openings 54 are disposed adjacent the periphery of the plate 52 and are circumferentially spaced as illustrated in FIGURE 3.

The additional coils 38 have a hot condensate return inlet (connected to steam traps of other equipment in the plant) 56 communicated therewith and an outlet line or pipe 58 communicated with the bottom thereof. A cold water inlet pipe 60 extends inwardly through a fitting 62 in the tank 18 below the cone 42 but above the opening 44 at the lower apex thereof. As illustrated in FIGURES 3 and 4, the cold water inlet 60 is substantially tangential to the tank or coils 38 so that as cold water enters the section of the tank 18 outwardly of the cone 42, it will be moved in a counter-clockwise direction to assure agitation of the water for intimate heat exchange coaction with the coil 38.

As illustrated in FIGURE 1, the inlet line or conduit 56 is connected to a connecting line 64 which in FIGURE 1 is illustrated as being broken off at 66 to indicate that condensate lines or steam trap lines from other plant equipment connect at this point so that return steam or condensate will be supplied to the inlet pipe or conduit 56. The outlet pipe or conduit 58 is also communicated with a pipe 68 which is communicated with the pipe 64 through a bypass valve 70 which is solenoid actuated from the aquastat 72 disposed in the lower portion of the tank 18 adjacent the bottom 40 so that as the temperature of the water within the lower end of the tank 18 reaches a predetermined temperature, the valve 70 will be opened thus bypassing steam or condensate back to a condensate return tank or receiver 74 which has a vent 76, a float control 78 and a return line 80 extending to the boiler with a circulating pump 82 being provided therein in a completely conventional manner.

The hot water heater of the present invention is capable of delivering a greater volume of heated water in a more efficient and economical manner and employs steam from an existing steam generator or boiler. This unit is ready to operate in only several minutes from a cold start and is compact and safe in operation and requires no cleaning, flushing or the like. The heater unit works only on demand and heats water only as required thus eliminates waste. This heater unit absorbs all the latent heat of the steam supply and also utilizes the available heat of outgoing condensate thus guaranteeing full utilization of the steam and maximum operating efficiency. The orifice is placed in the steam line just before entering the electric solenoid valve and this orifice will be varied depending upon the horsepower rating of the boiler, the degree of temperature raise and the gallons per hour desired.

The particular materials, pipe sizes and other structural details may vary for each individual installation. The auxiliary heating coil will effectively temper the incoming cold water and elevate the temperature thereof to provide for more efficient use of the latent and sensible heat of the hot condensate to increase the capacity and efficiency of the water heating unit so that a greater hot water production capacity is provided from a given quantity of steam.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water heater comprising a tank having a lower cold water inlet and an upper hot water outlet, a primary steam coil disposed in the upper part of said tank and immersed in water therein, said steam coil having one end thereof communicated with a steam supply line, the other end of said coil being communicated with a return line, said steam supply line having an orifice and Aquastat-controlled solenoid valve therein controlling the rate of flow of steam through the steam coil to condense the steam for utilizing the latent and sensible heat of the steam for increasing absorption of heat by the water in the tank so that condensate will be discharged from the return line, said coil being unique and new in that it has no steam trap at any point but utilizes a water column to prevent the discharge of steam, said tank including an auxiliary preheating coil in the lower end thereof spaced below the primary steam coil, said auxiliary preheating coil adapted to be connected to receive hot return condensate from other steam equipment in the same plant, the heat of which condensate would otherwise be largely exhausted to the atmosphere and lost, a truncated cone, point down, disposed between the two coils, said cone extending completely across the tank, a flat circular plate disposed above the cone and extending completely across the tank, said plate being provided with peripherally spaced holes to prevent convectional currents between the top and bottom portions of the tank except through the holes.

2. The structure defined in claim 1 wherein said supply and return line communicated with the lower coil include a by-pass valve therein, said by-pass valve connecting the supply line and return line and being solenoid controlled, an aquastat controlling the solenoid for opening the valve for by-passing hot condensate in relation to the lower coil to avoid overheating of the water in the lower portion of the tank.

3. The structure as defined in claim 3 wherein said inverted conical member is secured to the tank with the lower apex thereof received partially within the interior of the lower coil, the apex of said cone having an opening therein to enable flow of preheated water from the lower portion of the tank.

4. The structure as defined in claim 3 wherein said flat circular plate forms a closure for the tank above the inverted cone, said apertures in the plate enabling flow of water upwardly into the top part of the tank and across the primary steam coil therein for assuring heat exchange relation with the steam coil.

5. The structure as defined in claim 4 wherein said inverted cone has a depending cylindrical member defining the opening and forming a baffle for preheated water in the lower section of the tank.

6. The structure as defined in claim 5 wherein said cold water inlet is disposed above the lower apex of the cone and below the upper edge thereof and disposed in angular relation to the tank for guiding water in a circular path when it enters the lower portion of the tank.

7. The structure as defined inclaim 6 wherein the return line from the lower coil extends into a condensate return tank for subsequent discharge into a boiler.

8. The structure as defined in claim 7 wherein latent and sensible heat salvaged from hot condensate of other plant equipment, the heat of which condensate is otherwise largely lost to the atmosphere is accumulated in the water in the bottom part of the tank during protracted periods when there is an absence of demand on the primary heating coil for hot water thereby differentiating from conventional water heaters which sometimes have a preheater but which are effective only when there is a demand at frequent intervals on the primary heater for hot water.

References Cited

UNITED STATES PATENTS

| | | | |
|---|---|---|---|
| 507,633 | 10/1893 | Peck | 122—32 |
| 2,430,837 | 11/1947 | Tutein. | |
| 1,159,775 | 11/1915 | Kerr | 122—32 |

KENNETH W. SPRAGUE, *Primary Examiner.*